(12) United States Patent
Neelakantan et al.

(10) Patent No.: US 8,314,798 B2
(45) Date of Patent: Nov. 20, 2012

(54) DYNAMIC GENERATION OF CONTEXTUAL CHARTS BASED ON PERSONALIZED VISUALIZATION PREFERENCES

(75) Inventors: Jagdeesh Manickam Neelakantan, Bangalore (IN); Pracheer Gupta, Delhi (IN); Rahul Chandra Kini, Bangalore (IN); Thomas B Kuruvilla, Bangalore (IN); Abhishek Nagendra, Bangalore (IN)

(73) Assignee: Business Objects Software Limited, Dublin (IE)

( * ) Notice: Subject to any disclaimer, the term of this patent is extended or adjusted under 35 U.S.C. 154(b) by 418 days.

(21) Appl. No.: 12/572,288

(22) Filed: Oct. 2, 2009

(65) Prior Publication Data

US 2011/0080408 A1    Apr. 7, 2011

(51) Int. Cl.
*G06T 11/20* (2006.01)

(52) U.S. Cl. .................................................. 345/440
(58) Field of Classification Search ............... 345/440; 128/923; 705/7.38
See application file for complete search history.

(56) References Cited

U.S. PATENT DOCUMENTS

| | | | |
|---|---|---|---|
| 6,668,253 B1 * | 12/2003 | Thompson et al. ............. | 1/1 |
| 7,176,923 B2 | 2/2007 | Vignet | |
| 7,268,791 B1 * | 9/2007 | Jannink ........................ | 345/440 |
| 2006/0084850 A1 * | 4/2006 | Spinner et al. ............... | 128/923 |
| 2008/0005677 A1 | 1/2008 | Thompson | |
| 2008/0036767 A1 | 2/2008 | Janzen | |
| 2008/0082908 A1 | 4/2008 | MacGregor | |
| 2009/0157447 A1 * | 6/2009 | Busch ............................ | 705/7 |

* cited by examiner

*Primary Examiner* — Chante Harrison (57) ABSTRACT

A system and method for dynamic generation of contextual charts for reports based on personalized visualization preferences are described. In one embodiment, a system of an embodiment creates a chart for a report based on an analysis of past user preferences. In one embodiment, a system of the embodiment saves user behavior and preferences over time.

17 Claims, 10 Drawing Sheets

DYNAMIC GENERATION OF CONTEXTUAL CHARTS BASED ON PERSONALIZED VISUALIZATION PREFERENCES

FIELD OF THE INVENTION

The invention relates generally to visualizing reports, and, more specifically, to dynamic generation of contextual charts based on personalized visualization preferences.

BACKGROUND OF THE INVENTION

Charts are an effective way to analyze and visualize data. Reporting tools obtain data from data sources and provide the obtained data in table format. Typically, to obtain a chart, a user would run a query, obtain data in table format, and create the chart manually.

There are particular types of charts suited for the corresponding data but a user has to specifically select the most appropriate chart for the data returned. In case a user has used certain types of charts over time for certain types of objects, there are no mechanisms to remember and record his past behavior to give him the optimal chart during creation of new reports.

SUMMARY OF THE INVENTION

A system and method for visualizing reports are described. In one embodiment, a system creates a chart for a report based on the type of the report and past user preferences.

In one embodiment, a system of the embodiment analyzes saved reports to find a report closest to a current one and creates a chart based on the similarity between the two reports.

In one embodiment, a system of the embodiment records user behavior if the user changes an automatically generated chart and supplies recorded user behavior for future analysis and future automatic creation of charts.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for 'Dynamic Generation of Contextual Charts Based on Personalized Visualization Preferences' are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In various embodiments, a report is run to collect data from a data source and a chart is automatically constructed to present the resulting data set to the user. The chart may be constructed deterministically based on factors such as the data in the report and the context of the report. The appropriate chart to use for the report may be determined by an algorithm which may consider the current set of objects and the type of data and also the past behavior of the user. With time, the algorithm may store used charts and record which charts are used most of the time. Based on past user choices and the frequency of use of chart types, a system of an embodiment may decide which chart type to use for a report without the need of user intervention.

In various embodiments, objects creating a report are part of a universe (e.g., semantic layer) that contains metadata and business logic. A semantic abstraction can be a level of abstraction based on a relational, OLAP, or other data source or a combination of more than one existing semantic layers. A universe is a specific form of semantic abstraction where the semantic abstraction includes data model objects that describe the underlying data source and define dimensions, attributes and measures that can be applied to the underlying data source and data foundation metadata that describes a connection to, structure for, and aspects of the underlying data source. A data model object is an object defined within a semantic domain that represents a dimension of the underlying data source, represents relationships between dimension members and attributes, or provides calculations from, based on or designed to be applied to an underlying data source. Typically, in a universe, a data model object is assigned a common business term such that the user does not need to understand the specific logic of the underlying data source but can work with familiar terminology when constructing queries or otherwise accessing the data. Examples of common business terms include: customer, employee, product line, revenue, profit, attrition, fiscal year, quarter, and the like.

In various embodiments, a report k is a set of objects such that $O_k = D_k \cup M_k$, where $D_k$ is a set of dimensions for the report and $M_k$ is a set of measures for the report. Measures are objects quantifiable in a dimension. The set of measures may be actual quantities that can be calculated, for example, revenue, profit, and so on. Examples of dimensions may be year, month, day, and so on. For example, the measure "revenue" is quantifiable in the dimension "year" because a query can be run to extract data from a data source and provide the value for the revenue per year.

A dimension may be a line in a real or abstract space. An example of a real space dimension is a pair of antiparallel cardinal points on a compass, e.g., North and South, North-Northwest and South-Southeast. Another real dimension is time. An example of an abstract space dimension is a list of stores. The dimension is abstract because the list can be ordered alphabetically by name, by store number, by distance from head office, etc. Examples of dimensions include region, store, year, customer, employee, product line, and the like.

A dimension object may model a set of business entities of a common nature such as a geographical location, a product or group of products, and a time period, that are used to structure an analysis. Dimension objects can have properties (attributes or details) attached to them. For instance, a Customer could have an address. Dimension objects can be structured into OLAP hierarchies. For instance, Countries contain States, which contain Cities. When a Dimension object is directly used in a report, what appears is not the business entity, but an attribute, such as a unique name or caption, designed to be user-friendly.

A measure is a quantity as ascertained by comparison with a standard, usually denoted in some unit, e.g., units sold, dollars. A measure, such as revenue, can be displayed for the dimension "Year", which is in effect the aggregation of all revenue for all years. Corresponding measures can also be displayed for each of the values within a dimension. Region of focus is either set by default or definable by a user event. The user event includes the user clicking on an area of a table, chart, map or portion thereof, which displays quantitative information. The user can select one or more: charts, maps, columns or rows in a table, axes or data within a chart, data in a time series, or regions in a map. Alternatively, the user event can include the user specifying a parameter to a report document. The region of focus is an area of the report which the user wishes to explore.

A measure object models a quantity or variable item that usually takes its values as a function of a set of values for dimension objects. For instance, a Sales Revenue measure is a numerical value; there is a distinct value of this measure for each geographical location, each period of time, and each product or set of products. A measure is always associated with the group of dimensions on which it depends, called its dimensionality. For instance, the dimensionality of the measure Revenue is {Geography, Time, Product}, whereas the dimensionality of a measure "Population" might be {Geography, Time}—since populations of geographical entities vary with time but have nothing to do with products.

Figure 1:
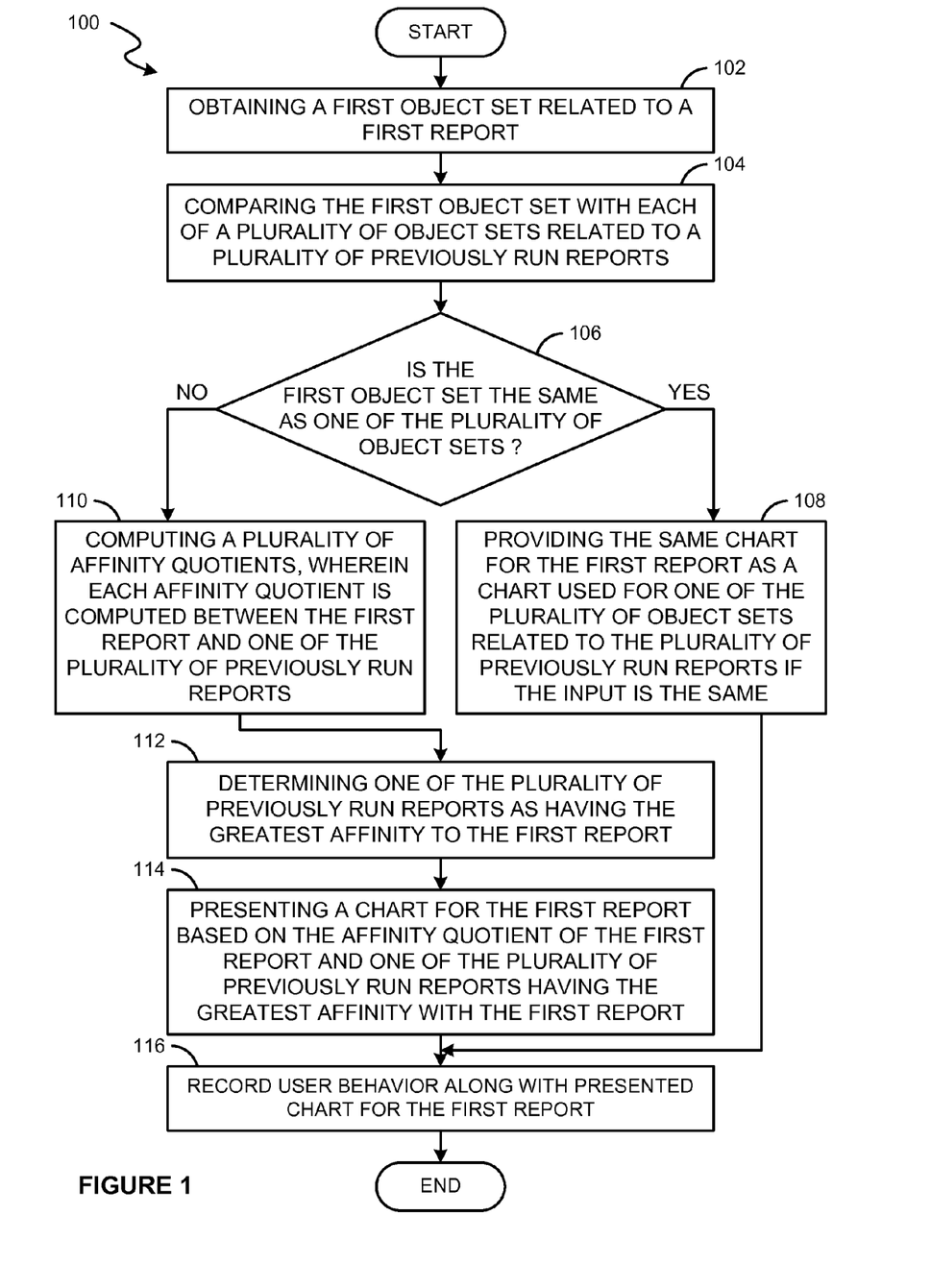
FIG. 1 is a flow diagram of an embodiment for dynamically generating a chart for a report.

FIG. 1 is a flow diagram of an embodiment 100 for dynamically generating a chart for a report. Referring to FIG. 1, at process block 102, a first object set related to a first report is obtained. The first object set related to the first report may be a data set defining a number of dimensions of data and a number of measures of data quantifiable in the selected dimensions. At process block 104, the obtained first object set is compared to a number of object sets related to a number of previously run reports. If at process block 106, the first object set is the same as one of the object sets related to the previously run reports, the chart type as used for the matching object set is used to create a chart for the first object set at process block 108. The first object set and an object set related to one of the number of previously run reports are determined to be the same if the object sets have the same dimension sets. If the first object set is not the same as one of the object sets related to the previously run reports, at process block 110, a number of affinity quotients between the first report and each of the previously run reports are computed. In various embodiments, an affinity quotient may be computed in accordance with the method presented in FIG. 2.

At process block 112, one of the previously run reports is determined to have the greatest affinity to the first report. In various embodiments, the one of the previously run reports is determined to have the greatest affinity with the first report if the affinity quotient computed between the first report and the one of the previously run reports has the greatest value among the number of computed affinity quotients in process block 110.

At process block 114, a chart is presented based on the affinity quotient between the first report and one of the previously run reports has the greatest affinity to the first report. The affinity quotient may be used to determine the similarity between the obtained first object set and the object sets related to the previously run reports. Based on such affinity determination, a decision can be made as to the dimension set of which of a number of previously run reports is most similar to the dimension set for the first report. Thus, a decision can be made as to what is the chart type to use to create a chart for the first report.

Figure 5:
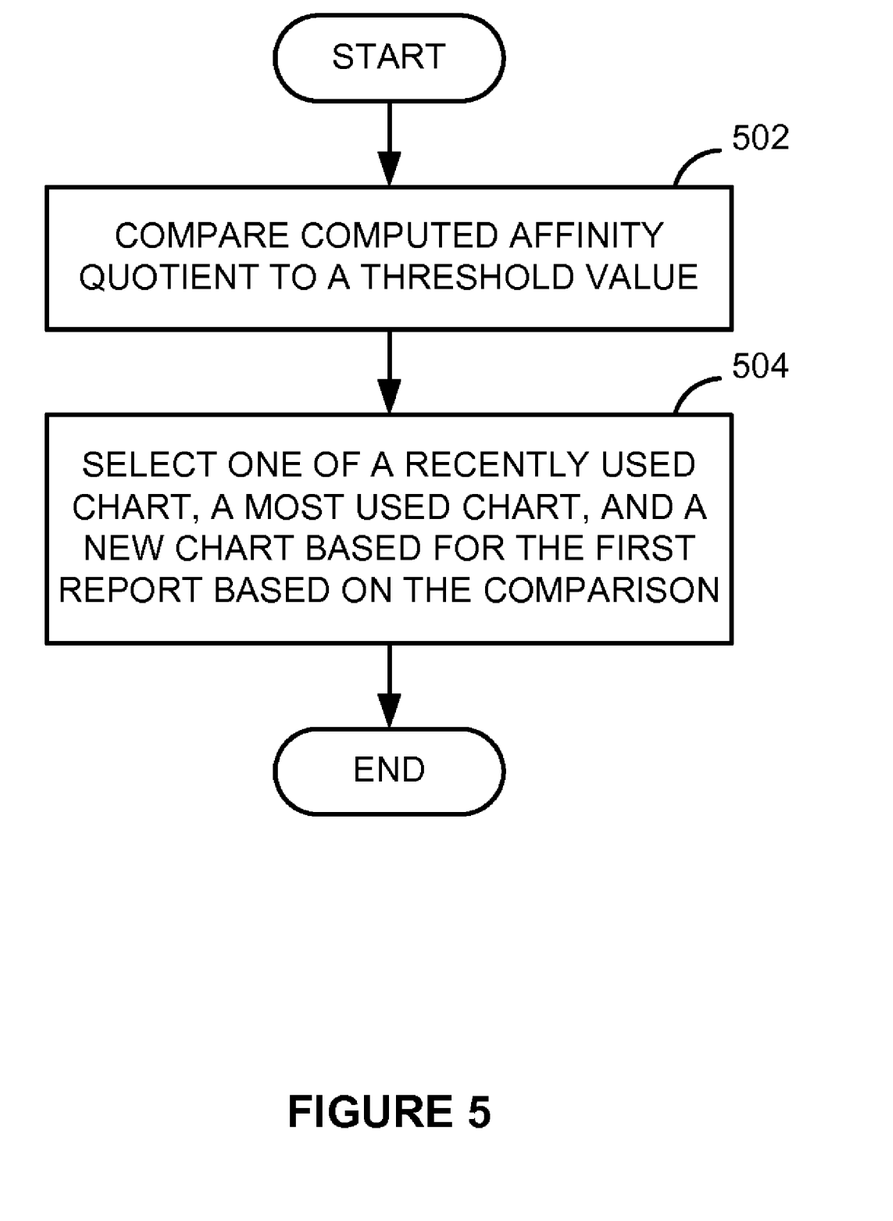
FIG. 5 is a flow diagram of an embodiment for selecting a chart for a report based on a computed affinity quotient.

In various embodiments, a decision to select a chart type based on a computed affinity quotient may be reached in accordance with the process presented in FIG. 5.

Figure 6:
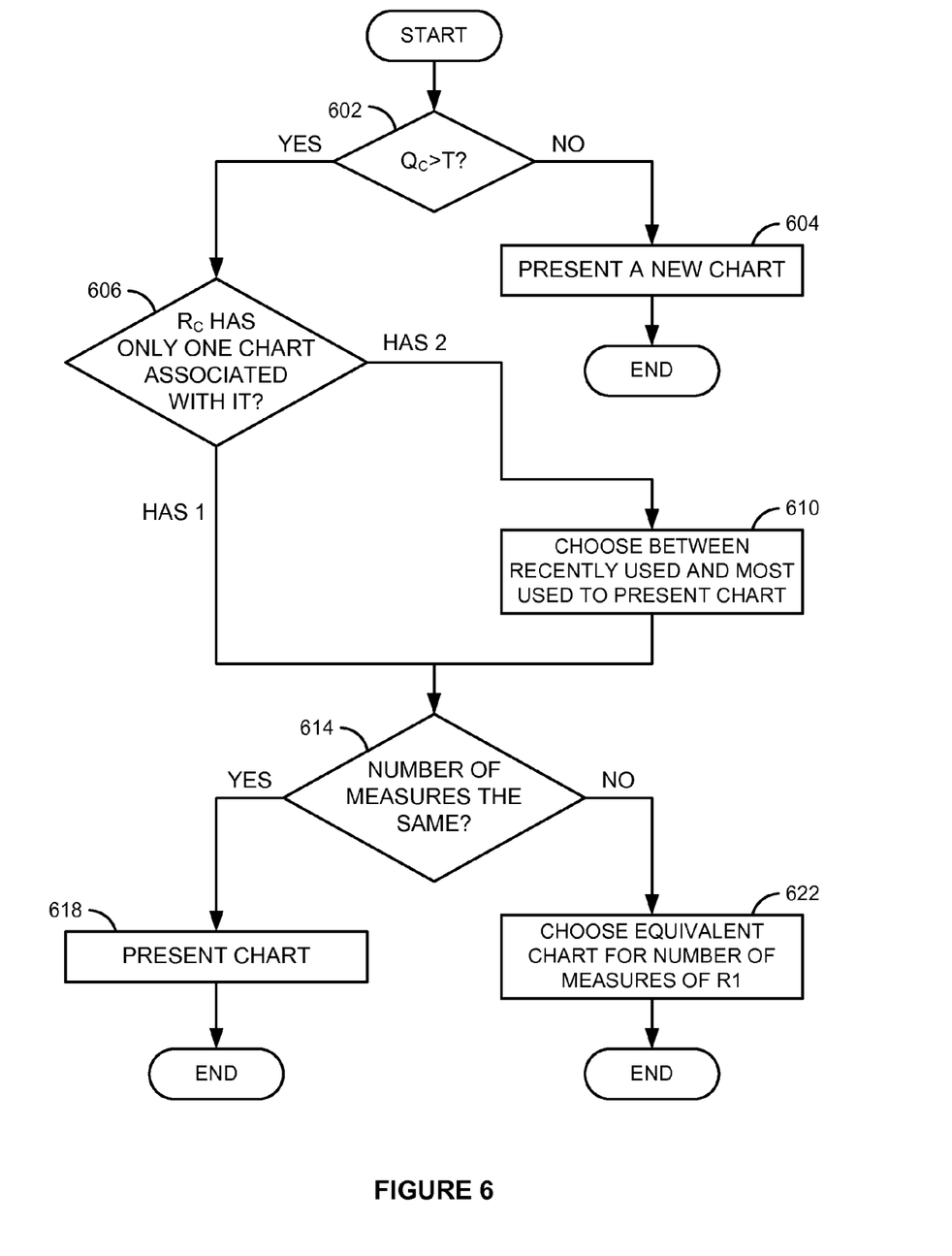
FIG. 6 is a flow diagram of an exemplary algorithm for selecting a chart for a report based on a computed affinity quotient.

In another embodiment, a decision to select a chart type based on a computed affinity quotient may be reached in accordance with the process presented in FIG. 6.

At process block 116, user behavior along with the presented chart is recorded for future reference. If the user changes the chart initially presented, user behavior is saved for future reference. Over time, user behavior and preferences are accumulated and based on such accumulated user preferences, a determination may be made as to which chart types the user may prefer. In various embodiments, user behavior is saved in accordance with the process as described in FIG. 8.

Figure 2:
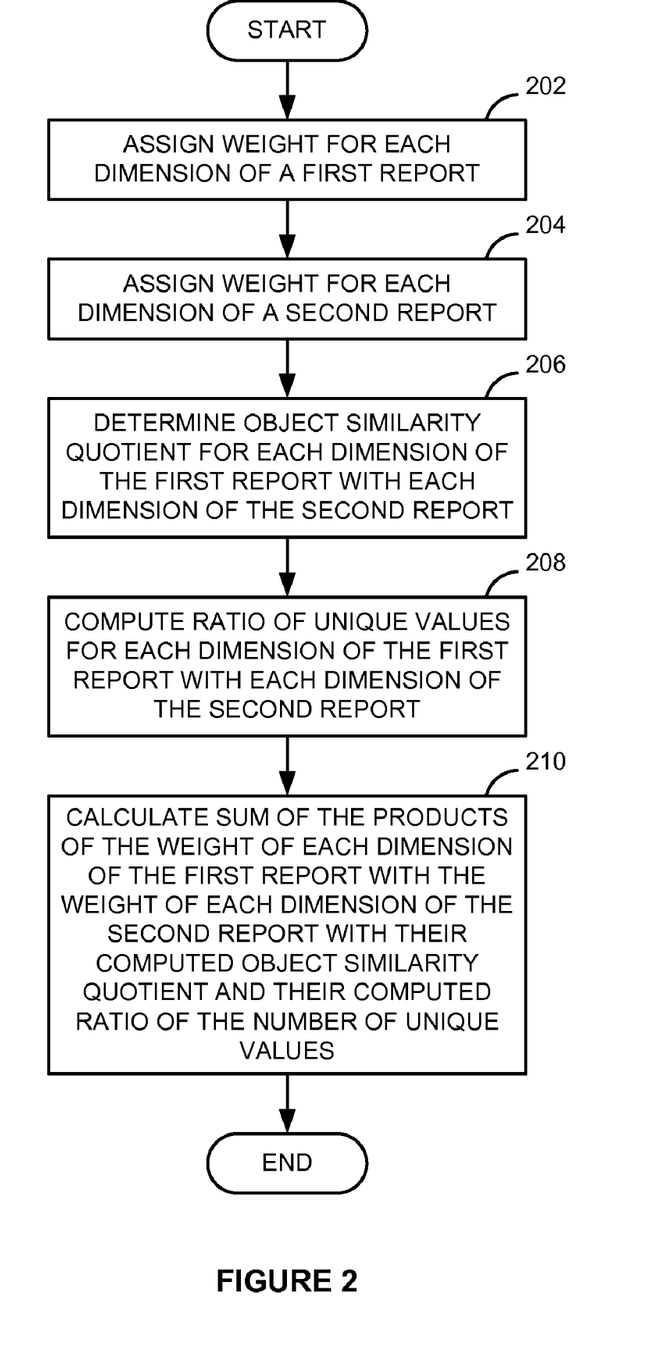
FIG. 2 is a flow diagram of an embodiment for computing an affinity quotient between a first report and a second report.

FIG. 2 is a flow diagram of an embodiment for computing an affinity quotient between a first report and a second report. The first report may be a newly created report and the second report may be one of a number of previously run reports. In various embodiments, an affinity quotient may be computed for a newly created report and each of the number of previously run reports. FIG. 2 refers to process block 110 of FIG. 1.

Referring to FIG. 2, at process block 202, a weight is assigned to each dimension of the first report. In various embodiments, a weight may be assigned by plotting a graph for the following function: $Y=f(x)=e^{(-0.5*x+1)}+0.5$. For a given dimension $d_i$ (where i is an integer; $1<=i<=d$), weight is determined using the following formula: $W_i=f(x=((i-1)*d/3.4))$, where d is the total number of dimensions for the report.

At process block 204, a weight is assigned to each dimension of the second report. At process block 206, an object similarity quotient (OS) is determined for each dimension in the first report with each dimension in the second report. At process block 208, a ratio of unique values is computed for each dimension in the first report with each dimension in the second report. At process block 210, the sum of the products of the weight of each dimension of the first report with the weight of each dimension of the second report with their computed object similarity quotient and their computed ratio of the number of unique values is calculated. In various embodiments, the following formula is used to compute the affinity quotient for a first and second report:

$$Q = \sum_{i=1}^{i<=d1} \sum_{j=1}^{j<=d2} \left( w1_i * w2_j * OS_{i,j} * \left(\frac{x}{y}\right)_{i,j} \right)$$

where Q is the affinity quotient, $w1_i$ and $w2_j$ are the weights assigned to the $i^{th}$ and $j^{th}$ dimension of the first and the second report, respectively; $OS_{i,j}$ is their object similarity quotient; $(x/y)_{i,j}$ is the ratio of the number of unique values for the $i^{th}$ and $j^{th}$ dimension, such that x<=y; and d1 and d2 are the number of dimensions in the first and the second reports, respectively.

Figure 3:
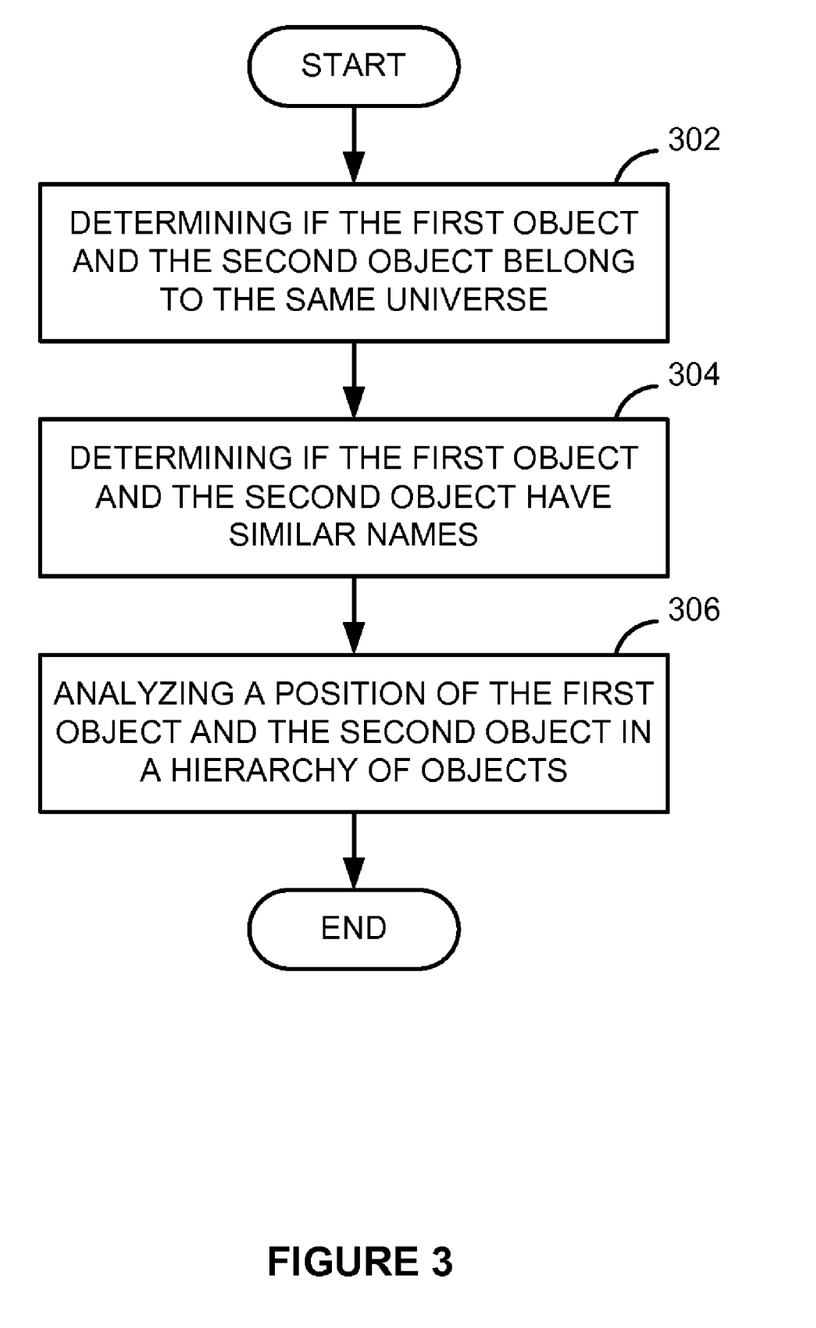
FIG. 3 is a flow diagram of an embodiment for computing an object similarity quotient between a dimension in a first report and another dimension in a second report.

FIG. 3 is a flow diagram of an embodiment for computing an object similarity quotient between a dimension (e.g., object) in a first report and another dimension in a second report. Referring to FIG. 3, at process block 302, it is determined if the first object and the second object belong to the same universe. If the first and second objects belong to the same universe, they may be readily compared because they may have the same metadata associated with them. At process block 304, it is determined if the first and second objects have the similar names. For example, if the first and second objects have the same name and belong to the same universe, it can be determined that the first and second objects represent dimensions representing the same type of data. For example, if both objects have the name "Year" and they belong to the same universe, it can be determined that both the first and second objects represent yearly data for a measure in a report. In another example, the first and second object may belong to different universes; the first object may be called "Year" and the second object may be called "Yr". Although the universes refer to different metadata and possibly the first and second objects may have different definitions, it can be determined that both the first and second objects refer to yearly data in a report based on the comparison of their names.

At process block 306, a position of the first object and a position of the second object are analyzed. The hierarchy of objects may also be used to determine the similarity between objects because in a universe, objects may be organized in hierarchies according to their type. For example, if the first object and second object do not belong to the same universe, and do not have the same or similar names, but belong to the same hierarchy, it can still be determined that the objects are similar. For example, if the first and second objects belong to the hierarchy called "Time" it can be determined that both objects (e.g., dimensions) are used in reports to quantify data in a time dimension such as year, quarter, etc. Thus, if all dimensions of a first report are at least similar to all dimensions of a second report, it can be determined that it may be beneficial to use the chart type of the second report to create a chart for the data of the first report.

In various embodiments, the process as described in FIG. 3 is implemented using the exemplary algorithm described in FIG. 4 below.

Figure 4:
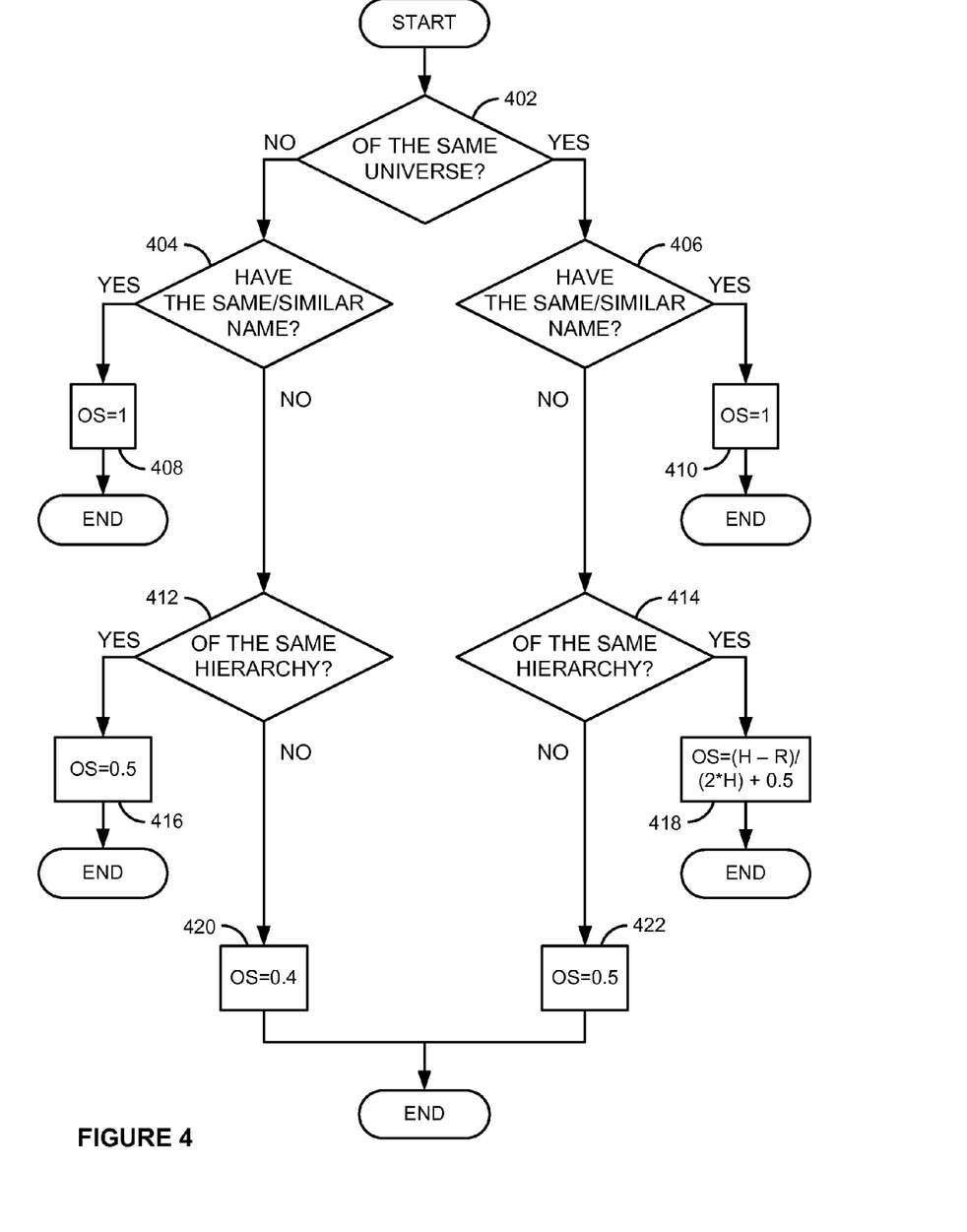
FIG. 4 is a flow diagram of an exemplary process for computing an object similarity quotient between a dimension in a first report and another dimension in a second report.

FIG. 4 is a flow diagram of an exemplary process for computing an object similarity quotient between a dimension in a first report and another dimension in a second report. Referring to FIG. 4, at process block 402, two objects are compared. In various embodiments, these objects are dimensions of a first and a second report. If the two objects are of the same universe, at process block 406, a comparison of the names of the first and second object is performed. If the first and second objects have the same name, at process block 410, the OS to be used in the calculation of the affinity quotient is assigned the value one. If the first and second objects do not have the same name, at process block 414, a check is performed to determine if the first and second object are of the same hierarchy. If the first and second objects are of the same hierarchy, at process block 418, the OS may be calculated using the following formula: OS=(H−R)/(2*H)+0.5, where H is the height of the hierarchy and R is the difference in rank of the first and second object. If the first and second objects are not of the same hierarchy, at process block 422, the OS equals 0.5.

If the check at process block 402 determines that the first and second objects are not of the same universe, at process block 404, a check is performed to determine if the first and second object have the same or similar name. In various embodiments, a system may have a record of object names considered to be similar or the same. For example, the system of the embodiment may record the expressions "Year", "Y", and "Yr" as all referring to the object "year", and thus, if a check is performed, it may be determined that two objects refer to the same dimension. If the first object and second object have the same or similar name, at process block 408, the OS is determined to equal one. If the first and second objects do not have the same or similar names, at process block 412, a check is performed to determine if the first and second objects are of the same hierarchy. If the first and second objects are of the same hierarchy, at process block 416, the OS is determined to equal 0.5. If the first and second objects are not of the same hierarchy, at process block 420 the OS is determined to equal 0.4.

FIG. 5 is a flow diagram of an embodiment for selecting a chart for a report based on a computed affinity quotient. In various embodiments, the affinity quotient is computed according to the method as described in FIG. 2. In various embodiments, an affinity quotient is computed for a first report and each of a number of previously run reports. The affinity quotient found to be the maximum of all computed affinity quotients determines that the saved report that produces this maximum affinity quotient in combination with the first report is the report having the greatest affinity to the first report. Referring to FIG. 5, at process block 502, the maximum affinity quotient is compared to a threshold value. At process block 504, based on the comparison, a chart is selected between a recently used chart, a most used chart, and a new chart.

In various embodiments, the process as described in FIG. 5 is implemented using the exemplary algorithm described in FIG. 6 below.

FIG. 6 is a flow diagram of an exemplary algorithm for selecting a chart for a report based on a computed affinity quotient. In various embodiments, the affinity quotient is computed according to the method as described in FIG. 2. In FIG. 6 below, the maximum affinity quotient is refereed to as "Qc", the first report is referred to as "R1" and the report having the greatest affinity to the first report is referred to as Rc.

Referring to FIG. 6, at process block 602, a check is performed to determine if the calculated affinity quotient (Qc) is higher than a threshold value T. In various embodiments, the threshold value T is computed using the following formula: Threshold(T)=Ceil(f(0)), where ceil(x) is defined as a function returning the smallest (that is, closest to negative infinity) double value that is not less than the argument x and is equal to a mathematical integer.

If Qc is not higher than the threshold value, at process block 604, a new chart is presented to the user. If Qc is not higher than the threshold value, it can be determined that R1 and Rc are not similar enough and thus the dimension set of Rc may not be beneficial for the determination of the chart type to use for R1.

If the calculated Qc is higher than the threshold value, at process block 606, a check is performed to determine how many charts are associated with Rc. If Rc has two charts associated with it, at process block 610, it is determined if a recently used chart should be used or a most used chart should be used. In various embodiments, such a determination can be made using the process as described in FIG. 7.

After the most used chart or recently used chart is chosen, at process block 614, a check is performed to determine if the number of measures of the first report and the chosen chart is the same. If both have the same number of measures, at process block 618, the chosen chart is presented. If both have a different number of measures, then at process block 622, a version of the chart best fitting for the number of measures is chosen.

If Rc has one chart associated with it, at process block 614, a check is performed to determine if the number of measures of the first and second report is the same. If both reports have the same number of measures, at process block 618, the chart used for Rc is chosen for the first report. If the reports have a different number of measures, then at process block 622, a version of the chart best fitting for the number of measures is chosen.

Figure 7:
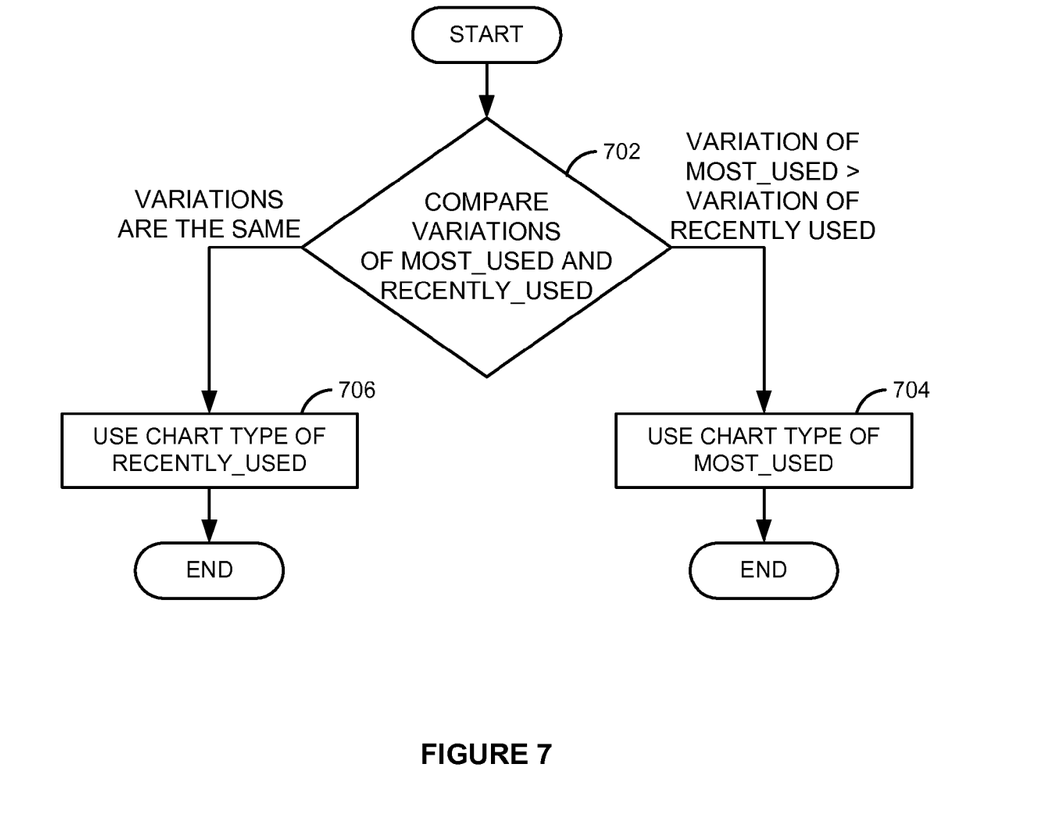
FIG. 7 is a flow diagram of an embodiment for choosing a chart type between a most used and a recently used chart.

FIG. 7 is a flow diagram of an embodiment for choosing a chart type between a most used and a recently used chart. To record user behavior, two parameters called recently used and most used may be introduced. Both parameters may have two fields, "chart_type" and "variation". The variation field may have values 1 or 2. As a first report is created, the chart_type is updated to point to the type of chart (for example, "bar chart") and the variation is set to 1 for both the recently used and most used parameters. Referring to FIG. 7, at process block 702, a comparison is performed to determine if the current values of the variation field in recently used and in most used are the same, or if the value of the variation of most used is higher. If the values of the variation fields are the same in both parameters, at process block 706, a chart is chosen based on the chart type recorded in the recently used parameter. If the value of the variation of most used is higher than the value of the variation of recently used, the chart type recorded in the chart type field in the most used parameter is chosen as the type of chart to use at process block 704.

Figure 8:
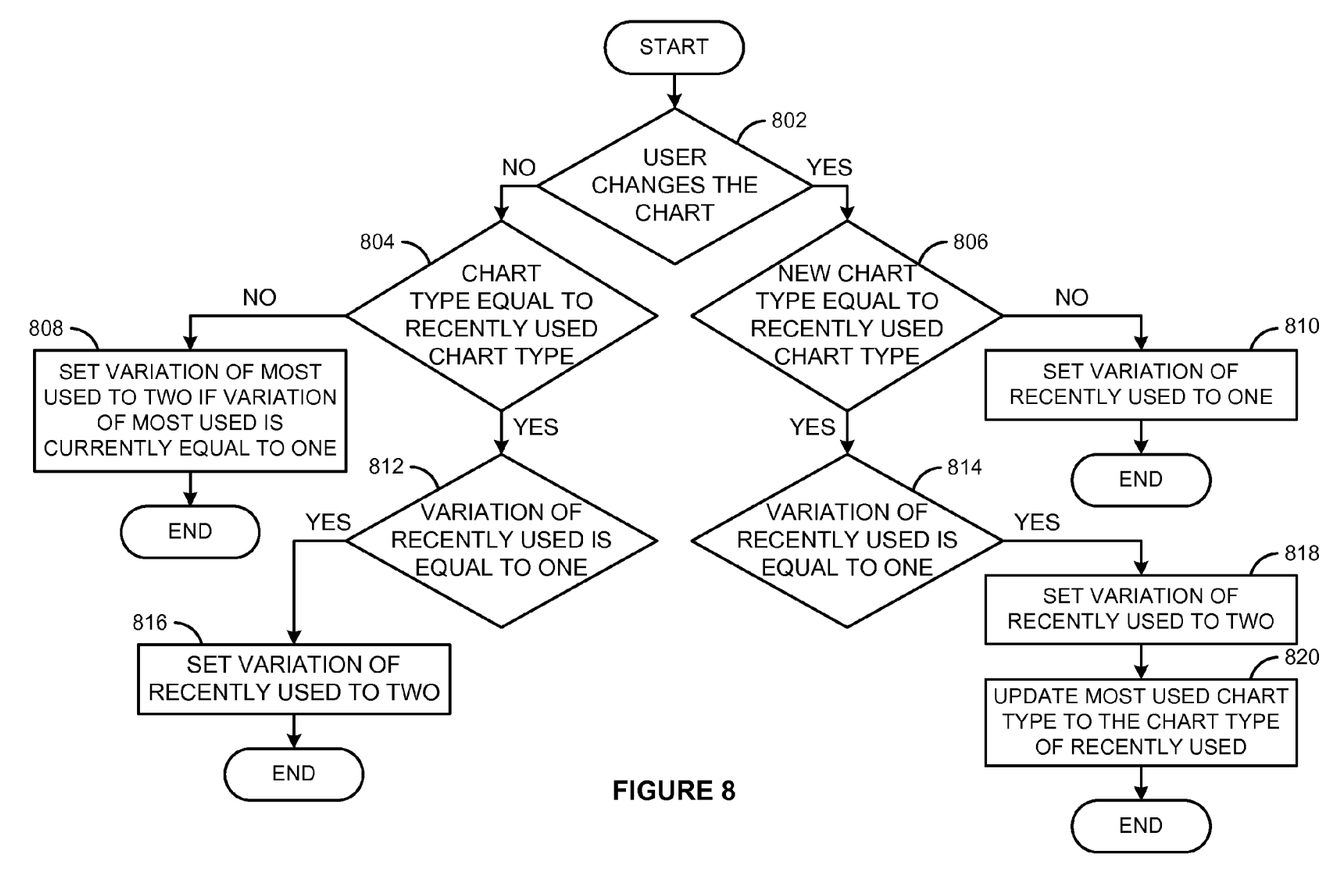
FIG. 8 is a flow diagram of an embodiment for recording user preferences.

If a user changes the chart after it is automatically created, the actions of the user are recorded and saved in the system as user preferences for future reference. FIG. 8 is a flow diagram of an embodiment for recording user preferences. Referring to FIG. 8, at process block 802, a check is performed to determine if the user has changed the chart. If the user has changed the chart, at process block 806, a check is performed to determine if the new chart type selected by the user equals the chart type recorded in the recently used parameter. If both chart types are the same, at process block 814, a check is performed to determine if the value of the variation field of the recently used parameter equals one. If the value of the variation field of the recently used parameter equals one, at process block 818 the value of the variation field of recently used is set to two. At process block 820 the value of the chart type field in the most used parameter is updated to the value of the chart type field of the recently used parameter. In various embodiments, a user may change a presented chart more than once. Thus, there may be intermediate charts before the user decides on a chart to use. In various embodiments, only the final chart the user chooses may be saved.

If at process block 806 the new chart type is not the same as the recently used chart type, at process block 810 the value of the variation field of the recently used parameter is set to one.

If at process block 802 the user does not change the chart, at process block 804 a check is performed to determine if the chart type of the chart presented by the system is the same as the chart type recorded in the chart type field of the recently used parameter. If the chart types are the same, at process block 812 a check is performed to determine if the value of the variation field of the recently used parameter equals one. If the value of the variation field of the recently used parameter equals one, at process block 816 the value of the variation field of the recently used parameter is set to two.

If at process block 804 the chart types are not equal, at process block 808 the value of the variation field of the most used parameter is set to two if the current value of the variation field of the most used parameter equals one.

In various embodiments, if the values of both the most used and recently used parameters equal two, the value of the chart type field of the most used parameter is updated to the value of the chart type field of the recently used parameter.

Figure 9:
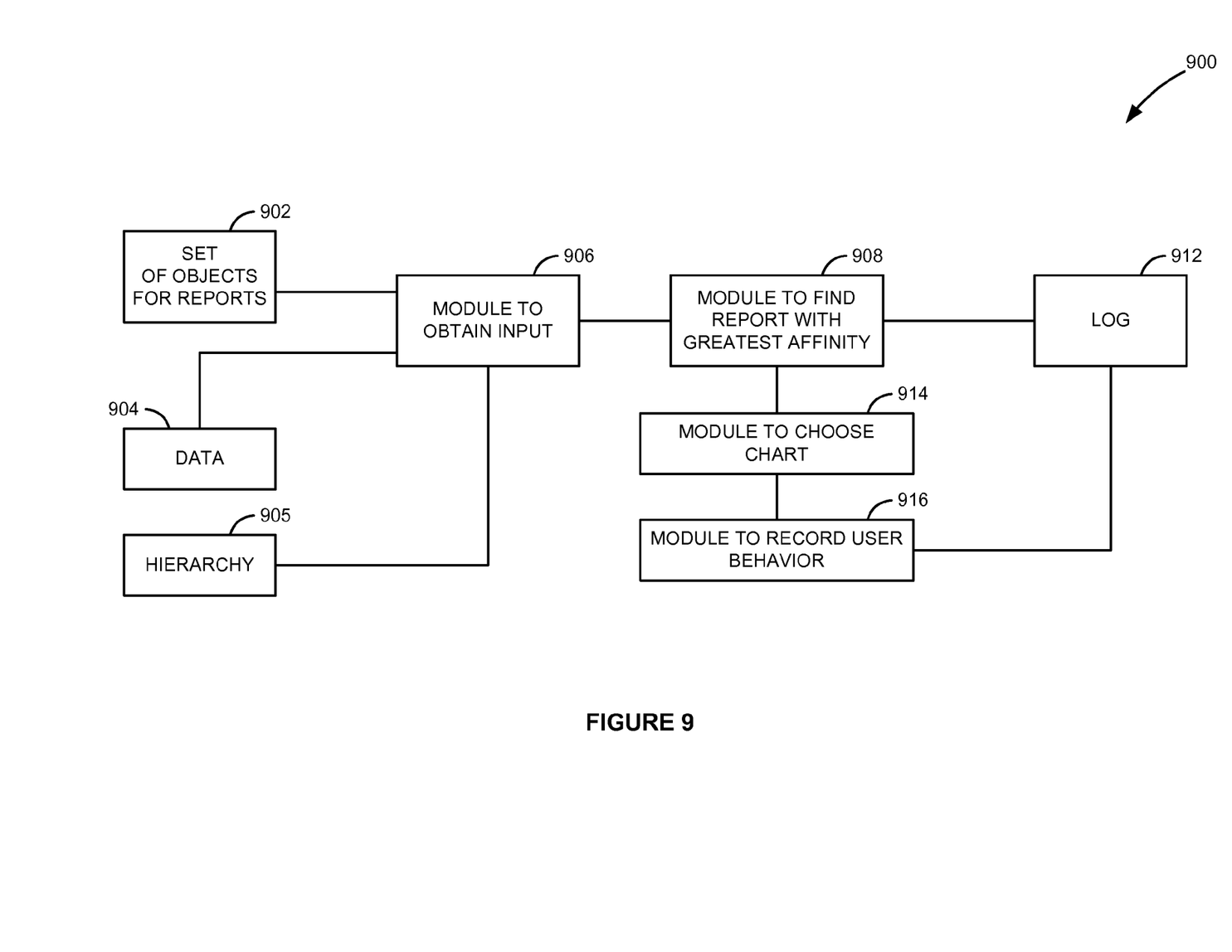
FIG. 9 is a block diagram of an embodiment for automatically creating a chart for a report and recording user behavior.

FIG. 9 is a block diagram of an embodiment for automatically creating a chart for a report and recording user behavior. Referring to FIG. 9, system 900 of the embodiment includes a module to obtain input 906. The module to obtain input 906 obtains sets of objects for reports 902, actual data for reports 904, and a hierarchy of objects for reports 905. To create a chart for obtained input, the module to find the report with the greatest affinity 908 receives input from the module to obtain input 906 and also receives input from the log 912. The module to obtain input 906 provides input for a current report being created and the log 912 provides input about saved or previously run reports. In various embodiments, the system 900 may create a chart automatically using the method as described in FIG. 1. In various embodiments, the module to find the report with the greatest affinity 908 may find the closest report by identifying the maximum affinity quotient between a current report and a number of previously run reports using the method as described in FIG. 2. The module to choose chart type 914 analyzes the current report and the closest report to find a suitable chart for the current report. In various embodiments the module to choose chart type 914 may choose a chart for the current report using the method as described in FIG. 4. The module to record user behavior 916 may record a user changing the chart after the automatically created chart is presented to the user.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 10:
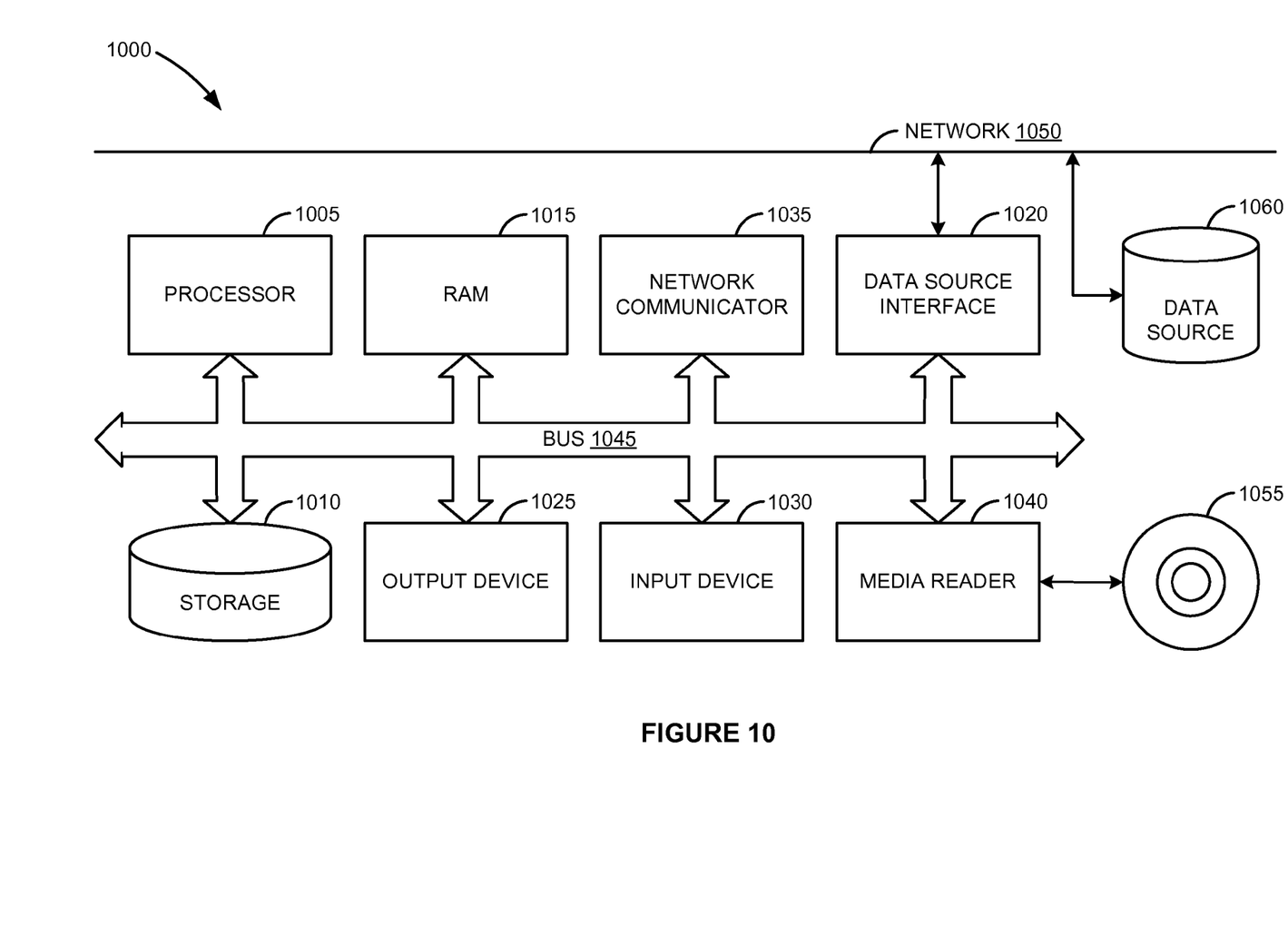
FIG. 10 is a block diagram of an exemplary computer system.

FIG. 10 is a block diagram of an exemplary computer system 1000. The computer system 1000 includes a processor 1005 that executes software instructions or code stored on a computer readable medium 1055 to perform the above-illustrated methods of the invention. The computer system 1000 includes a media reader 1040 to read the instructions from the computer readable medium 1055 and store the instructions in storage 1010 or in random access memory (RAM) 1015. The storage 1010 provides a large space for keeping static data where at least some instructions could be stored for later execution. The stored instructions may be further compiled to generate other representations of the instructions and dynamically stored in the RAM 1015. The processor 1005 reads instructions from the RAM 1015 and performs actions as instructed. According to one embodiment of the invention, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The layer may include logic associated with the underlying data allowing it to automatically formulate queries for execution against the underlying data sources. The logic includes connection to, structure for, and aspects of the data sources. Some semantic layers can be published, so that it can be shared by many clients and users. Some semantic layers implement security at a granularity corresponding to the underlying data sources' structure or at the semantic layer. The specific forms of semantic layers include data model objects that describe the underlying data source and define dimensions, attributes and measures with the underlying data. The objects can represent relationships between dimension members and provide calculations associated with the underlying data.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:
1. A machine-readable storage device having machine readable instructions for creating a chart for a report, the instructions tangibly stored thereon which when executed by the machine, cause the machine to perform operations comprising:

receiving a first object set related to a first report, wherein the first object set includes at least some dimensions and measures of the first report;

comparing the first object set to each of a plurality of object sets related to a plurality of previously run reports;

upon determining that the first object set matches one of the plurality of object sets related to the plurality of previously run reports:

identifying a type of a chart generated for the matching object set;

upon determining that the first object set does not match the plurality of object sets related to the plurality of previously run reports:

computing a plurality of affinity quotients, wherein each affinity quotient is computed between the first report and each of the plurality of previously run reports, determining one of the plurality of previously run reports as having the greatest affinity to the first report, and identifying a chart type for the first report based on the affinity quotient of the first report and the one of the plurality of previously run reports having the greatest affinity with the first report; and creating the chart for the first report using the identified chart type.

2. The machine-readable storage device of claim 1, further comprising instructions that cause the machine to perform operations to record user behavior towards the chart created for the first report along with the chart created for the first report.

3. The machine-readable storage device of claim 2, wherein recording user behavior towards the created chart comprises:

determining if a user changes the chart; and updating a recently used parameter or a most used parameter based on the determination.

4. The machine-readable storage device of claim 3, wherein the recently used parameter and the most used parameter have a variation field to specify a latest usage and a chart type field to specify the chart used.

5. The machine-readable storage device of claim 1, wherein computing the affinity quotient comprises:

assigning a weight for each dimension of the first report;

assigning a weight for each dimension of a second report, wherein the second report is one of the plurality of previously run reports;

determining an object similarity quotient for each dimension of the first report with each dimension of the second report;

computing a ratio of a number of unique values for each dimension of the first report with each dimension of the second report; and calculating the sum of the products of the weight of each dimension of the first report with the weight of each dimension of the second report with their computed object similarity quotient and their computed ratio of the number of unique values.

6. The machine-readable storage device of claim 5, wherein determining the object similarity quotient comprises:

analyzing a position of a first object and a second object in a hierarchy of objects;

determining that the first object and the second object have similar names; and determining that the first object and the second object belong to a same universe.

7. The machine-readable storage device of claim 1, wherein determining one of the plurality of previously run reports as having the greatest affinity to the first report comprises:

determining a maximum affinity quotient among the plurality of affinity quotients; and identifying one of the plurality of previously run reports that has produced the maximum affinity quotient with the first report as having the greatest affinity to the first report.

8. The machine-readable storage device of claim 1, wherein identifying the chart type comprises:

comparing the affinity quotient of the first report and the one of the plurality of previously run reports having the greatest affinity with the first report to a threshold value;

selecting one of a recently used chart, a most used chart, and a new chart based on the comparison; and identifying a chart type of the selected chart.

9. The machine-readable storage device of claim 8, wherein selecting one of a recently used chart comprises:

selecting the new chart if the affinity quotient of the first report and the one of the plurality of previously run reports having the greatest affinity with the first report is lower than the threshold value;

selecting the recently used chart if the affinity quotient of the first report and the one of the plurality of previously run reports having the greatest affinity with the first report is greater than the threshold value, and a recently used variation and a most used variation are the same; and selecting the most used chart if the affinity quotient of the first report and the one of the plurality of previously run reports having the greatest affinity with the first report is greater than the threshold value and the most used variation is greater than the recently used variation.

10. A computerized system, including a processor, the processor communicating with a memory storing instructions, the instructions comprising:

a module to obtain input related to a first report, the input including first object set representing dimensions and measures;

a module to obtain a plurality of previously run reports from a log on the memory;

a module to determine one of the plurality of previously run reports as having the greatest affinity with the first report based on comparing the first object set to each of a plurality of object sets related to the plurality of previously run reports;

determining a type of a chart generated for the previously run report having the greatest affinity with the first report;

a module to select a chart for the first report using the determined chart type; and a module to record user behavior towards the selected chart.

11. The system of claim 10, wherein the obtained input further includes data related to the report and a hierarchy of the set of objects related to the report.

12. The system of claim 10, wherein the module to select a chart for the first report is further operable to compare the dimensions and measures of the first report to the dimensions and measures of the one of the plurality of previously run reports having the greatest affinity to the first report.

13. A computerized method, comprising:

determining an affinity of a first report to a plurality of previously run reports comprising:

computing a plurality of affinity quotients between the first report and each of the plurality of previously run reports by,
  assigning a weight for each dimension of the first report;
  assigning a weight for each dimension of one of the plurality of previously run reports;
  determining an object similarity quotient for each dimension of the first report with each dimension of the one of the plurality of previously run reports comprising:
    analyzing a position of a first object and a second object in a hierarchy of objects;
    determining if the first object and the second object have similar names; and
    determining if the first object and the second object belong to the same universe;
  computing a ratio of a number of unique values for each dimension of the first report with each dimension of the one of the plurality of previously run reports; and
  calculating the sum of the products of the weight of each dimension of the first report with the weight of each dimension of the one of the plurality of previously run reports with their computed object similarity quotient and their computed ratio of the number of unique values;
identifying a maximum affinity quotient among the computed plurality of affinity quotients; and
determining one of the plurality of previously run reports that has produced the maximum affinity quotient with the first report as having the greatest affinity to the first report;
creating a chart for the first report based on the determined affinity; and
recording user behavior towards the created chart.

14. The computerized method of claim 13, wherein creating a chart for the first report based on the determined affinity comprises:
  comparing the determined affinity to a threshold value; and
  selecting one of a recently used chart, a most used chart, and a new chart based on the comparison.

15. The computerized method of claim 14, wherein selecting comprises:
  selecting the new chart if the affinity quotient of the first report and the one of the plurality of previously run reports having the greatest affinity with the first report is lower than the threshold value;
  selecting the recently used chart if the affinity quotient of the first report and the one of the plurality of previously run reports having the greatest affinity with the first report is greater than the threshold value, and a recently used variation and a most used variation are the same; and
  selecting the most used chart if the affinity quotient of the first report and the one of the plurality of previously run reports having the greatest affinity with the first report is greater than the threshold value and the most used variation is greater than the recently used variation.

16. The computerized method of claim 13, wherein recording user behavior towards the created chart comprises:
  determining if the created chart is modified after it is created; and
  updating a recently used parameter or a most used parameter based on the determination.

17. The computerized method of claim 16, wherein the recently used parameter and the most used parameter have a variation field to specify a latest usage and a chart type field to specify a type for the created chart.

* * * * *